Nov. 29, 1966     K. LOEFFLER     3,289,073
METHOD AND APPARATUS FOR MEASURING THE OSCILLATION OF
VANES, PARTICULARLY IN JET PROPELLING UNITS
Original Filed June 2, 1959     3 Sheets-Sheet 1
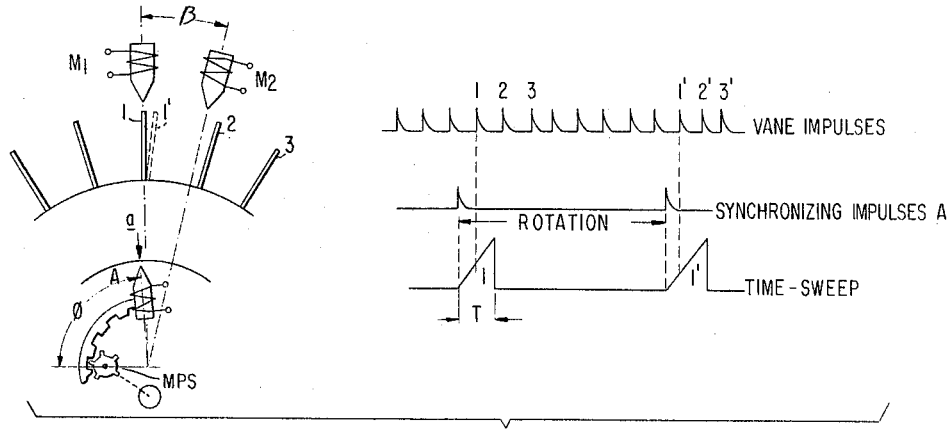
FIG.1
FIG.2     FIG.3     FIG.4
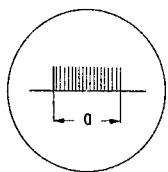 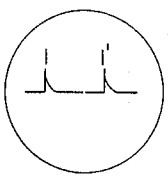 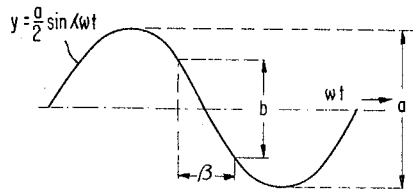
FIG.5     FIG.6
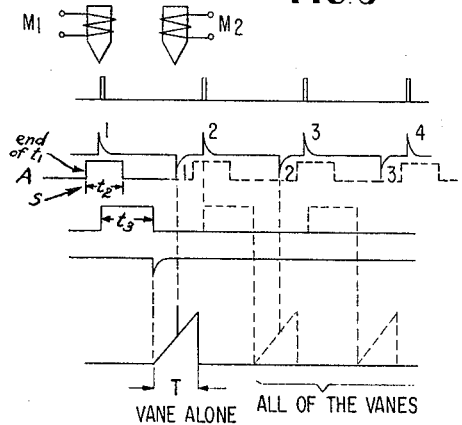 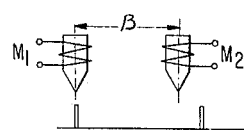
FIG.7
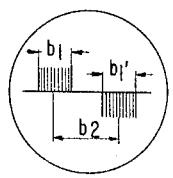
INVENTOR.
KURT LOEFFLER
BY *Dicke & Craig*
ATTORNEYS Nov. 29, 1966  K. LOEFFLER  3,289,073
METHOD AND APPARATUS FOR MEASURING THE OSCILLATION OF
VANES, PARTICULARLY IN JET PROPELLING UNITS
Original Filed June 2, 1959  3 Sheets-Sheet 2
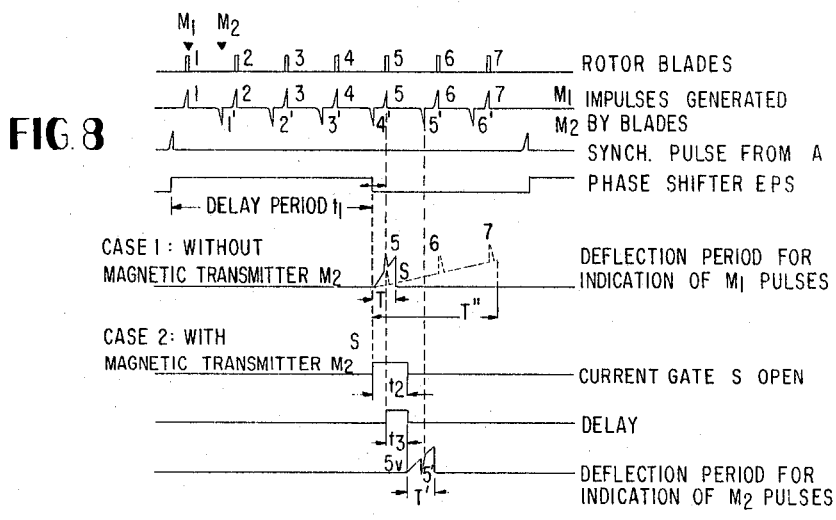
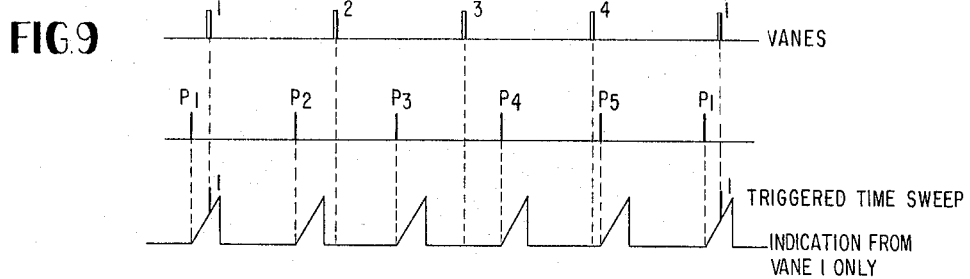
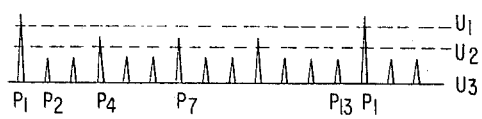
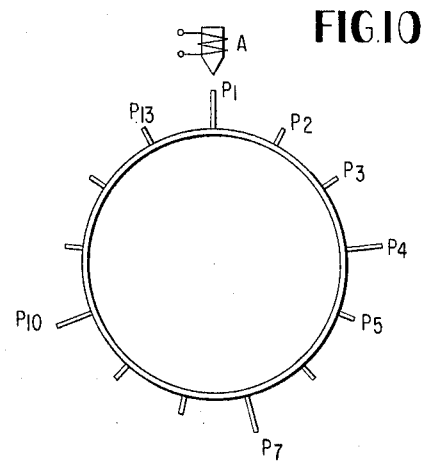
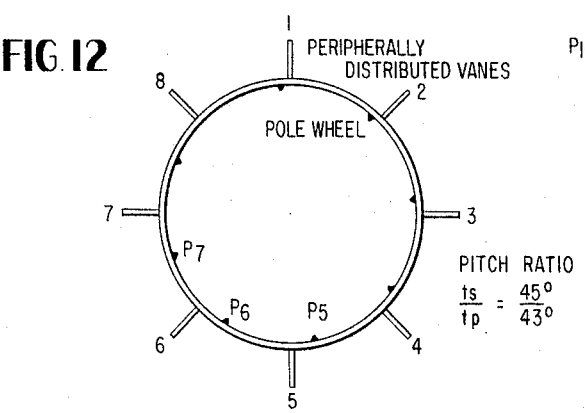
INVENTOR.
KURT LOEFFLER
BY Dicke & Craig
ATTORNEYS Nov. 29, 1966     K. LOEFFLER     3,289,073
METHOD AND APPARATUS FOR MEASURING THE OSCILLATION OF
VANES, PARTICULARLY IN JET PROPELLING UNITS
Original Filed June 2, 1959     3 Sheets-Sheet 3
FIG. 13
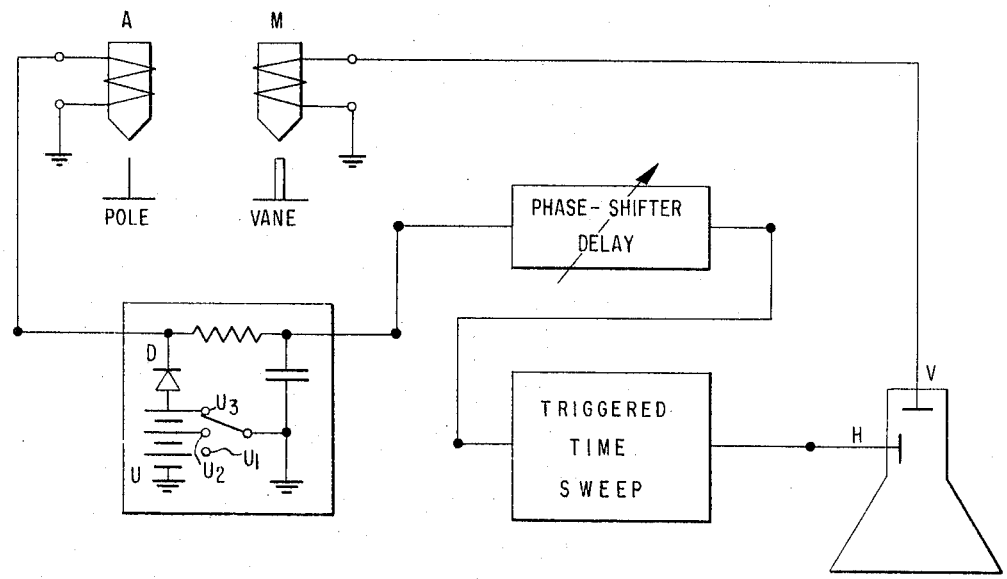
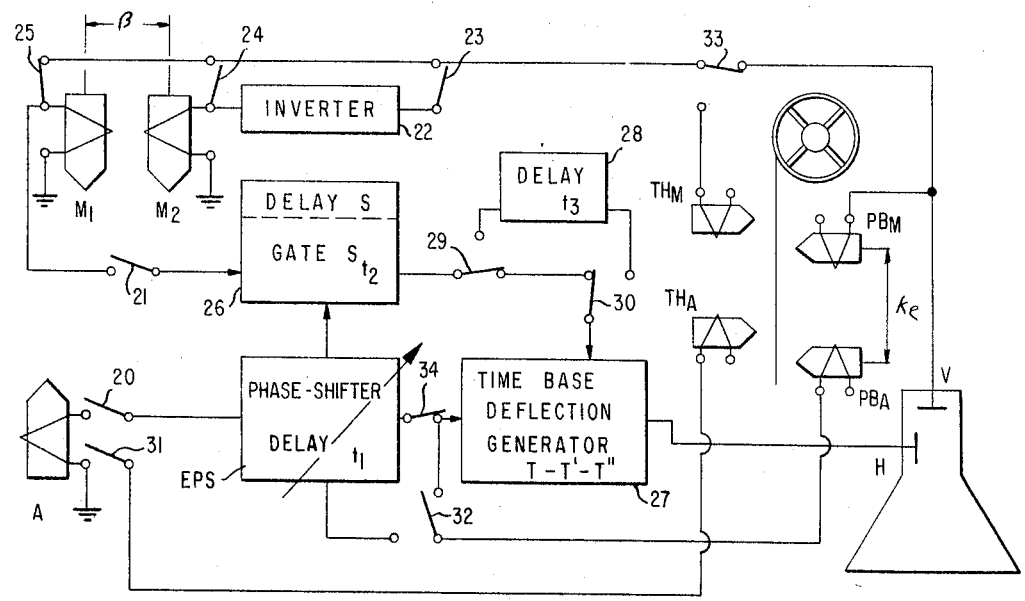
FIG. 14
INVENTOR.
KURT LOEFFLER United States Patent Office 3,289,073
Patented Nov. 29, 1966

3,289,073
METHOD AND APPARATUS FOR MEASURING THE OSCILLATION OF VANES, PARTICULARLY IN JET PROPELLING UNITS
Kurt Loeffler, 55 Werastrasse, Stuttgart, Germany
Continuation of application Ser. No. 817,555, June 2, 1959. This application Mar. 28, 1963, Ser. No. 268,644
Claims priority, application Germany, June 4, 1958, D 28,240
10 Claims. (Cl. 324—34)

The present application is a continuation application of my copending application Serial No. 817,555, filed June 2, 1959, now abandoned.

The present invention relates to a method of measuring the oscillations of rotary or non-rotary blades or vanes, particularly the blades or vanes of jet propulsion units.

Oscillations of blades in rotary systems have been measured heretofore in the conventional manner by means of strain guages. The use of these strain guages required the provision on the rotor of additional means. In particular, a plurality of leads which were subject to the effect of centrifugal forces had to be installed in such a manner as to extend from the strain guage to one end of the rotor shaft. Means for transferring measurement voltages generated by such guages, in the form of slip rings or the like, for example, would require a mounting arrangement at this end of the shaft. For the purpose of such voltage transfer, slip rings have been normally used which, while affording a large number of measuring points, are liable to frequent breakdowns and repairs. In the alternative, the transfer of the guage voltages has been effected heretofore by transformers which, however, entail the limitation that in such case the number of measuring places was limited to one or two. A further disadvantage of the known measuring systems was the change in the aerodynamic streamline or flow profile of the blades caused by the strain guages and the leads thereof.

It is an object of the present invention to provide an improved method and apparatus which avoid the aforementioned disadvantages. The present invention relies upon the generation of electrical signal pulses representative of the oscillating motion and angular displacement of the tip of a rotor blade or vane, and the display of such pulses upon a time measurement device, such as the time base of a cathode ray oscilloscope. By means of a periodically recurring synchronizing pulse the time base sweep of a cathode ray oscilloscope is triggered or started, and the time of the triggering is selected by means of a phase shifter so that each blade signal pulse occurring within the sweep period may be represented, preferably with a sweep having a variable time expansion.

The method according to the present invention consists in measuring the angular displacement of a selected blade tip on the rotating rotor body with respect to a fixed point on the stator, either in relation to the position of such blade tip at a second fixed point on the stator, or in relation to a non-displaceable reference point rigidly rotating in unison with the rotor body which point thus locates and defines a reference radius vector, whereby the ratio between the relative blade tip deflection occurring within a predetermined time as the rotor and blade pass points fixed in space to the maximum blade deflection serves as a means for determining the blade oscillation frequency. A periodically accurately triggered pulse and a pulse produced by the blade tip itself are compared with each other on an appropriate expanded time base display for the purpose of measuring the angular displacement or deflection of the blade tip.

One solution in accordance with the present invention consists in producing a pulse when a predetermined blade tip passes a first magnetic transmitter fixed in space, and triggering the start of the time sweep of a cathode ray oscilloscope by means of this pulse. A second blade tip pulse produced when said predetermined blade passes a further magnetic transmitter is displayed within the occurring time sweep on the screen of the cathode ray oscillograph.

The blades themselves produce the pulses by magnetic generation as they pass transmitter points fixed in space. The trigger of the time sweep for the representation of a selected single blade is controlled either by a fixed synchronizing pulse periodically recurring during rotor rotation or by the pulse which such blade itself produces at a second transmitter point, which blade pulse is gated or passed on to trigger the time sweep by the synchronizing pulse per se. It is possible to select a particular blade in accordance with the present invention by the use of a mechanical phase shifter rigidly coupled to the period of rotor rotation which serves to shift the synchronizing pulse. The pulse of any desired blade or blade group may be selected and reproduced on the cathode ray oscillograph by means of this phase shifter.

A material advantage of the invention is the ability to determine both the type and frequency of blade oscillations. If the frequency of oscillation bears a desired ratio, either fractional or variable to the frequency of rotation of the rotor, then the oscillation is represented on the screen of the cathode ray oscilloscope as a band whose width is a measure of double the maximum oscillation amplitude. In contrast thereto, a blade oscillating at an integral multiple of the frequency of rotor rotation produces a constant displacement of the indication on the screen which remains fixed, since it produces the same deflection at the measuring place during each rotation.

For purposes of determining the frequency of oscillation, both the maximum oscillation deflection that occurs as well as the maximum relative deflection occurring within a given angular distance are measured. This takes place according to the present invention in such a manner that the impulse of a blade produced at a place fixed in space severs for triggering the time sweep for the indication of the place of the same blade displaced by a predetermined angle $\beta$. It is thereby feasible by means of suitable conventional electronic circuitry to indicate on the cathode ray oscilloscope screen either a single blade, or all the blades may be indicated simultaneously. Knowing the angle, the frequency of blade oscillation may be calculated from the ratio of relative to maximum blade oscillation band width.

Blade oscillations having an ordinal number which is any fraction of the rotational frequency of the rotor produce in this case a band on the screen which corresponds to the maximum or largest relative deflection, since during a large number of rotations the relative deflection of each blade repeatedly reaches its maximum value at the same corresponding angular point.

For the purpose of determining the frequency of blade oscillations which are integral multiples of the rotor rotation frequency, two pulses which are produced by one blade passing two spaced magnetic transmitters are indicated on the oscilloscope by means of two triggering pulses for the time sweep so that the relative deflection may be determined from the distance of the two stationary indicated pulses. The maximum value of the oscillation may be determined by angular displacement of the two spaced transmitters as a pair along the circumference of the turbo engine, or by switching from one to another of several transmitter pairs arranged with equal angular spacing about such circumference. Such blade oscillations will exhibit nodal points and antinodes which are stationary in a fixed pattern.

By reversing the pulse produced at one of the two magnetic transmitters or blade pulse producers in such a manner that one channel produces a negative pulse, it is possible to produce an oscilloscope display having superimposed oscillations according to the present invention so as to separate those blade oscillation frequencies having an ordinal number which is a desired fraction of the rotor rotational frequency from those having integral ordinal numbers. The former are reproduced on the screen as pulse bands having a predetermined width, whereas the average spacing distance between such bands corresponds to those latter oscillations which exhibit integral multiple frequencies.

The examination of a large number of blades in the entire rotational speed range would require an excessively long operating time within resonance ranges that may become dangerous under certain circumstances. In order to avoid this, the present invention proposes to record the pulse sequence operation occurring in the entire rotational speed range on two synchronous channels of a sound tape recorder, and to displace the phase position $p$ which remains constant during the recording, only upon reproduction as described. The reproduction then takes place from endless tape loops driven at constant rotational speeds. The necessary phase displacement on "playback" or reproduction may take place, especially in the case of recording with two synchronizing pulses according to the present invention, by a physical longitudinal displacement of the reproducing head for the synchronizing channel relative to that of the head for the signal channel.

For purposes of measuring oscillations of stator blades, the present invention proposes to permit the magnetic pulse transmitter or producer to rotate and to effect the transfer to the stationary part of the turbo-engine by means of a simple rotating transformer.

Further features of the present invention will become more obvious from the following description when taken in connection with the accompanying drawing, and wherein:

FIGURE 1 is a schematic view of a measuring system and manner of operation thereof;

FIGURES 2 and 3 are various forms of indication on the cathode ray screen;

FIGURE 4 is a representation of the magnitudes necessary for determining the frequency;

FIGURES 5 and 6 represent the operation for determining different measuring magnitudes;

FIGURE 7 is a further representation on the cathode ray screen;

FIGURE 8 is a schematic representation of the several frequencies and time base relationships which exist in practicing the different forms of the invention;

FIGURES 9 to 11 are schematic views of a modified embodiment of a measuring system in accordance with the present invention and its operation;

FIGURE 12 is a schematic view of a measuring arrangement for stiff blades, and

FIGURES 13 and 14 are schematic diagrams of suitable electrical circuitry for carrying out the measurements.

Referring now to the drawing wherein like reference numerals are used throughout the various views to designate corresponding parts, and more particularly to FIGURE 1, the rotor blades 1, 2, 3, etc., which all lie within one plane, produce impulses when passing by the two fixed magnet transmitters $M_1$ and $M_2$, located on the stator structure of the device under test. The magnetic generation of such impulses by means of a rotatable pole element which coacts with a fixed wound magnetic pole element is not new, per se, and is recognized in the prior art. Specific examples of such impulse generation known to those skilled in the art may be found in the following U.S. patents: Hardigg, 2,575,710; De Brosse et al., 2,931,940; or Harman, 2,941,120.

Such impulses are indicated on a cathode ray oscilloscope tube by coupling them through appropriate circuits to the vertical deflector plates thereof, to produce traces as illustrated in FIGURES 2 and 3. The starting or release time of the horizontal sweep deflection of the cathode ray electron beam may be controlled either by a synchronizing impulse occurring periodically with the rotor rotation which is generated by a rigidly co-rotating magnet pole $a$ located on the rotor passing a synch trigger transmitter A which is fixed on the stator structure as indicated in FIGURE 1; or by the impulse which is generated by a predetermined blade passing by the first magnet transmitter $M_1$ as indicated in FIGURE 5. Generation of the synch trigger impulse by the magnet and pole arrangement $a$, A as illustrated in FIGURE 1 may follow the examples of the apparatus of the aforementioned U.S. patents, or any other suitable device, such as that shown in U.S. Patent 2,941,396 of Adams.

Referring to FIGURE 14, it will be apparent that closure of switches 20 and 34 permits the first-mentioned FIGURE 1 synchronization of the horizontal sweep generator 27 by a pulse generated at transmitter A. The time of occurrence of such synch pulse may be varied by rotating the knob of the mechanical phase shifter MPS to displace transmitter A about the circumference of the stator. If switches 20 and 21 are both closed and switch 34 is opened, with the switches 29 and 30 positioned as shown, the horizontal sweep will be synchronized by an impulse generated when any selected blade or vane passes transmitter $M_1$ as illustrated in FIGURE 5. The time of application of such a selected $M_1$ pulse to the sweep generator 27 is controlled by the impulse from transmitter A which is passed through the electrical phase shifter delay device EPS and used to determine the delay time $t_1$ indicated in FIGURE 5. Switch 24 is provided to couple a further impulse generated when vane 1 passes transmitter $M_2$ to the vertical deflector plates V, so as to produce the display trace shown as the lower-most waveform of FIGURE 5.

In order to distinguish the pulses displayed on the oscilloscope which are generated by blades passing the second magnet transmitter $M_2$, particularly when both $M_1$ and $M_2$ pulses are to be displayed, as further described below, a polarity inverter element 22 may be inserted in the circuit of FIGURE 14 by the closure of switch 23; switch 24 being placed in an open position. $M_2$ pulses without such inversion are displayed when switch 24 alone is closed, and the opening of both switches 23 and 24 will remove all pulses generated by transmitter $M_2$ from the oscillograph display. Switch 25 applies pulses generated at transmitter $M_1$ to the vertical deflector plates for display when in the closed position as shown in order to produce the wave form relationships illustrated in FIGURES 1, 3 and 6, 7. However, for the FIGURE 5 mode of operation, switch 25 is opened.

Since, however, all of the blades when passing by transmitter $M_1$ generate an impulse, care must be taken that only the impulse of one selected blade, for example, blade 5, will release the horizontal sweep. This is done, according to a different form of the invention, in a manner indicated by the waveforms of FIGURE 8, wherein the impulse forthcoming once per revolution of the synch trigger transmitter A blocks all of the impulses generated by $M_1$ during one rotor revolution except a single one with the aid of gate means S, which is illustrated by the block element 26 in FIGURE 14. In order to be able to select the impulses generated in $M_1$ for individual display, one after the other, the electrical phase shifter EPS acts in such a manner that the synchronizing impulse (A) opens the gate means S so as to unblock the current path between $M_1$ and the horizontal sweep generator 27 of the oscilloscope, not at the time of synch pulse A, but only after an adjustable delaying time $t_1$, as illustrated in FIGURE 8, Case I. In this mode of operation of the invention, switches 20 and 21 should be closed; switches 34, 23 and 24 opened; and switches 25, 29 and 30 positioned as shown in FIGURE 14.

The deflection sweep time of the oscilloscope is now set to such a small value T that only one blade tip impulse will be indicated. In case I, in which the magnet transmitter $M_1$ is utilized, only the impulse of blade 5—selected according to FIGURES 8 and 14—will be indicated. The impulses of the blade group 5, 6, 7 (shown in dash and dotted lines) may be indicated by increasing the deflection sweep time to a period T", by varying the time constants of the deflection sweep which is generated within the block element 27, FIGURE 14.

FIGURE 8, Case II, indicates a further mode of operation of the apparatus in which two magnet transmitters $M_1$ and $M_2$ are utilized. The gate S as provided by element 26 is opened, after completion of the delay $t_1$, for only the short interval $t_2$ within which the $M_1$ impulse of the selected blade 5 occurs. In order to be able to now work with as small a deflection sweep time T' as is desired, the time of application of this sweep is referred to as close as possible before the occurrence of the $M_2$ impulse 5' of the blade 5 with the aid of another delay $t_3$ which is provided by delay element 28. Switches 29 and 30 permit the optional utilization of this further delay element 28 so that the start of the sweep T' takes place at time $5_v$. The $M_2$ impulse 5', which has been inverted by its passage through element 22 to distinguish it on the oscillograph display, is indicated during the horizontal deflection time T'.

To restate the broad inventive concept, the rotor blades produce pulses as they pass over magnetic transmitters or generators located at predetermined stator points $M_1$ and $M_2$ fixed in space. Such pulses are utilized in a known manner to produce a visual indication of the timed recurrence of a selected blade or blades on the screen of a cathode ray oscilloscope. The triggering of the oscilloscope time sweep for the representation of the pulses of a single selected blade may be controlled by the pulse which such blade tip produces itself when passing over the first magnetic transmitter $M_1$ as illustrated in greater detail in FIGURE 5, when further gated or released by a fixed synchronizing pulse periodically produced during the rotor rotation by means of the trigger generator A. Alternatively, the triggering of the horizontal time sweep is by the pulse produced by trigger generator A, which time of occurrence may be varied by means of the mechanical phase shifter. The pulses of each blade or blade group may be selected by means of this phase shifter and may be selectively represented thereby on the screen. This operation is clearly shown in FIGURE 1. In certain cases, the FIGURE 5 mode of operation is preferred, for even though the trigger generator pulse from transmitter A is employed, the basic sweep synchronization is controlled by a pulse generated by the same blade tip which is under test observation on the oscilloscope, and thus any dynamic variation or "jitter" effect is canceled out by this self-synchronization.

A phase displacement which is either mechanically or remotely actuated by displacement of a magnet pole $a$ along the circumference of the rotor body is possible in accordance with the invention, but in practice would often involve considerable difficulties; because normally there is not sufficient space on the rotor to physically accommodate such an arrangement. Therefore, when mechanical phase shifting is utilized, it is preferred to displace the trigger producer A of the pair (A, $a$) about the circumference of the stator structure as illustrated in FIGURE 1 by the angular rotation arrow $\phi$, and the fragmentary representation of a mechanical phase shifting means MPS.

In the case of a single periodically recurring synchronizing pulse which is generated by the magnetic transmitter A, as indicated in FIGURE 1 once for each revolution of the rotor, electronic phase shifting has to extend, if it is to serve for the indication of all blades, over a complete 360° rotor rotation. In practice, however, in many cases considerable rotational speed fluctuations occur which come from the rotor drive, from rotational impacts, or rotational oscillations. These rotor speed fluctuations are erroneously indicated as movements of the blade because the phase position of the blades is not rigidly coupled to the rotor rotation. This error does not occur with the mechanical phase shifter MPS since the unblocking or triggering of the horizontal time sweep may be arranged to take place always shortly before the generation of the blade pulse or pulses, within which shortened time period only an extremely small fluctuation of the speed of rotor rotation may occur.

In order to avoid the mechanical adjustment of the phase position of a single synchronizing pulse generator, the present invention proposes to trigger the oscilloscope time sweep by several poles $P_1$, $P_2$, $P_3$, etc., each similar to the pole $a$ of FIGURE 1 distributed along the circumference of the rotor and rotating in unison therewith. A triggering pole is thereby coordinated with each blade in such a manner that the pole-to-blade distance is different in each case in order that the pulses generated by separate blade tips will not coincide when displayed on the oscilloscope screen. If, for example, as indicated in FIGURE 9, the number of poles is selected larger by one than the number of blades $z$, it is possible by means of appropriate phase shifting or displacements which need be no larger than the spacing distance between adjacent blades, for all blades of the series to be indicated on the screen either sequentially or in groups.

FIGURE 9 illustrates such an arrangement for the case of $z=4$, showing four blades cooperating with five trigger poles.

A further advantage of this arrangement results due to the fact that the distance of the pulse on the screen is compressed to the $1^{nth}/z+1$ value. It is also possible to effect an indication simultaneously of several blades whereby the sensitivity of the indication is increased by a factor $(z+1)$, compared with the triggering of the time sweep by a single trigger pulse per rotation.

In order to avoid a flowing into each other of the pulse bands which occurs on the oscilloscope screen when the blade deflection reaches the value $1/z+1$ of the blade distance, the number of poles may be appropriately reduced. If, for example, every other pole is omitted, such as poles $P_2$ and $P_4$ in FIGURE 9, then with a given phase displacement, blades 2 and 4 are not indicated so that the available oscilloscope display band is, in effect, expanded and becomes larger.

In order to permit selection of the number of poles to be displayed, a further embodiment of the present invention which is illustrated in FIGURES 10, 11 proposes the use of a pole trigger wheel having poles of different characteristics, for example, a different size or area or metallic composition, which thereby produce voltage pulses of different magnitudes. By appropriate electronic circuitry as shown for example, in FIGURE 13, including rectification means D and a direct current bias source U having selectable output levels as determined by the switch contacts $U_1$, $U_2$, $U_3$, the number of trigger pulses available per rotor rotation may be suitably selected. FIGURES 10 and 11 illustrate the conditions and relations of a rotor wheel having 13 poles. By changing the bias level for the rectified pulses, it is possible to selectively indicate either a single blade (1) which serves, for example, as reference blade for the numbering by use of the bias $U_1$; or any third blade up to the tenth, i.e., blades (4), (7) and (10) may be indicated by the use of bias $U_2$; or all blades may be indicated on the screen by the use of bias $U_3$.

With very rigid blades in connection with which only very slight deflections may be expected, the pole-to-blade phase displacement distance may be reduced further by reducing the pole pitch as indicated schematically in FIGURE 12. Even though the number of poles then becomes equal to the number of blades, in contradistinction to the embodiment illustrated in FIGURE 9, each pole and blade pair has a different distinct spacing and there results a place having the largest pole distance (FIGURE 12), which, however, cannot influence the measurement.

An important feature of the present invention is the ability of determining the type and frequency of blade oscillation. If the frequency of blade oscillation bears a ratio that is either a desired fraction or variable with respect to the frequency of rotor rotation, then the oscillation is reproduced as a pulse band $a$, the width of which is a measurement for the maximum double amplitude of blade deflection as illustrated in FIGURE 2. In contradistinction thereto, a blade oscillating at an integral multiple to the frequency of rotor rotation and which has the same deflection during each rotation at the measuring place, produces a stationary pulse displacement as illustrated in FIGURE 3.

For purposes of determining the frequency of blade oscillation, known harmonic oscillation laws may be applied, by using the formula which indicates for a sinusoidal oscillation the interdependence between the maximum deflection $a$ and the maximum relative deflection $b$ occurring within a given angular distance $\beta$, as shown in FIGURE 4. As those skilled in the art realize, the blade tip oscillations follow harmonic motion laws, and analysis thereof may be made in accordance with established formulae, such as that presented at pages 337 through 342 in the text "Mechanical Vibrations" by Den Hartog, 3rd ed., 1947; McGraw-Hill.

The measurement of the maximum relative deflection $b$ takes place according to the present invention in such a manner that the blade tip pulse produced by the fixed transmitter generator $M_1$ serves, after suitable delay, for triggering of the time sweep for the indication of the pulse produced at $M_2$ by the same blade displaced with respect to $M_1$ by an angle $\beta$ as illustrated in FIGURES 1, 4 and 5. By means of appropriate electronic circuitry, as previously described, it is possible that both a single blade as well as all the blades may be simultaneously indicated on the screen.

Blade oscillations having a frequency which is a fractional ordinal number $k$ of the rotational frequency of the rotor also produce a pulse band which corresponds to the values $b$ during a plurality of rotations, the relative deflection of each blade at the locations $M_1$, $M_2$ repeatedly reaches the maximum value $b$ at some time.

For determining blade oscillations haveing a frequency which is an integral multiple $k$ of the rotor rotational frequency, both pulses produced by means of one blade at $M_1$ and $M_2$ are indicated with the aid of two trigger pulses so that the relative deflection may be deduced from the distance of both pulses as displayed in a stationary arrangement as illustrated in FIGURES 6 and 7. The absolute maximum of the oscillations may be determined by angular displacement of the transmitter pair $M_1$ and $M_2$ along the circumference or by switching several transmitters arranged with the same spacing angle, whereby the oscillation in this case exhibits fixed nodal points and antinodes.

By distinguishing the oscilloscope display representation of the pulses produced at $M_1$ and $M_2$ by directing the pulses generated at $M_2$ through inverter 22 of FIGURE 14 so as to provide negative pulses for application to the cathode ray tube, superimposed oscillations having an ordinal number of any suitable fraction may be separated from those of integral order. The former are indicated as pulse bands having a width $b_1 = b_1'$ as shown in FIGURE 7, whereas the average distance $b_2$ corresponds to the blade oscillations which are integral multiples of the rotor frequency.

The correct examination of a larger number of blades of a wheel over the entire rotational speed range would require a relatively long operating period in resonance ranges which might become destructively dangerous under certain circumstances. In order to avoid this inconvenience, the present invention proposes, as further illustrated in the circuit diagram of FIGURE 14, using switches 31, 32 and 33, to record the entire pulse sequence occurring during a slow acceleration or deceleration within the entire range of interest on two synchronous channels of a magnetic tape; with the synchronizing pulses from generator A recorded on one channel by the tape head means $TH_A$ when switch 31 is closed, and blade tip pulses recorded on the other channel by the tape head means $TH_M$ by properly positioning the switch 33. In order to counteract an undesired displacement $\rho$ that is introduced by the necessary physical spacing of the magnetic heads and which remains constant during the recording, a suitable phase correction between the synchronizing pulse and the signals may be inserted during the reproduction from endless tape loops which are driven at constant rotational speeds. Any undesired pulse displacement which might occur during direct measurements taken at slowly varying rotor rotational speeds due to the use of the constant time-sweep synchronizing interval is thereby also avoided. Additionally, no complicated mechanical installations are necessary at the rotor shaft end as would be the case where mechanical phase shifting of the synchronizing pulses was used.

Correction of the undesired phase displacement $\rho$, particularly in the case of recording with two synchronizing pulses $M_1$ and $M_2$ according to the present invention, may take place by longitudinal displacement of the tape "playback" reproducing head $PB_A$ for the synchronizing channel relative to the signal reproducing head $PB_M$. As illustrated in FIGURE 14, switch 32 routes the reproduced synchronizing pulses to the sweep generator 27 upon playback, either directly, or through the electrical phase shifter EPS. Blade tip pulses to be displayed on the oscilloscope are reproduced from the magnetic tape by the signal reproducing head $PB_M$. The physical separation $\kappa\rho$ of the tape heads $PB_A$ and $PB_M$ is proportional to the phase displacement $\rho$, and by moving one head with respect to the other, proper phase correction is introduced upon playback. A two-channel magnetic tape recorder including means for such phasing of the timing or synchronizing channel is known in the prior art, and forms no part of the present invention; for example, the arrangement of the Guttwein Patent 2,695,211 could be adapted for such use.

In an analogous manner, the measurement at a stator blade can take place following the principle of the invention, only the magnetic transmitter $M_1$ now has to rotate which requires a special construction by reason of the high centrifugal forces. The transfer of the pulse to the stationary part is then achieved by a known simple rotary transformer consisting of two coaxial coils, for example, as shown in British Patent 762,759 of Harrison. Otherwise, the remainder of the arrangement corresponds to that already described hereinabove.

I claim:

1. Apparatus for measuring the oscillation frequency and angular displacement of blades, especially of the rotor-vanes of turbo-engines comprising, in combination, means to produce a first electrical signal pulse at the time at which a synchronizing reference point on the rotor body which locates a radius vector rotating rigidly with said rotor body passes a fixed point in space adjacent to said rotor, means to produce a second electric signal pulse at the time at which the tip of a selected vane passes a second fixed point in space adjacent to said rotor, and means responsive to the first and second pulses to display the amplitude of said second pulse on a time base whose display time is related to the time of production of said first pulse.

2. Apparatus for measuring the oscillation frequency and angular displacement of blades, especially the rotor-vanes of turbo-engines comprising in combination, means to produce a first electric signal pulse at the time at which the tip of a selected vane passes a first fixed point, means to produce a second electric signal pulse at the time at which the tip of said vane passes a second fixed point, and means responsive to the first and second pulses to display on a time base the amplitude of at least the second pulse, the display time being related to the time of production of said first pulse.

3. Apparatus as in claim 2 wherein said means to produce said first and second pulses comprises electro-magnetic pulse generators mounted at said fixed points and arranged for operation in sequence.

4. Apparatus as in claim 3 further including a pole wheel having a plurality of circumferentially spaced magnetic poles, said pole wheel being rigidly and coaxially mounted on the rotor body and having a desired pole to blade phase displacement for generating a trigger pulse for said time base display means.

5. Apparatus as in claim 4 wherein the several circumferentially spaced magnetic poles of said pole wheel are of periodically different dimensions to thereby generate trigger pulses which are of periodically different direct current amplitudes.

6. Apparatus as in claim 5 further including means to produce a variable level direct current bias voltage, and means to compare the generated periodically different direct current amplitude trigger pulses with such bias voltage for selectively displaying desired ones of the periodically different direct current amplitude trigger pulses.

7. Apparatus as in claim 1, including additional means to record said first and second pulses and to later play back said recorded pulses for display on said time base means, and switch means to selectively connect the means producing said first and second pulses to said time base display means or to said additional means.

8. Apparatus as in claim 2, including additional means to record said first and second pulses and to later play back said recorded pulses for display on said time base means, and switch means to selectively connect the means producing said first and second pulses to said time base display means or to said additional means.

9. A method of testing rotary or non-rotary vanes or blades of turbo-engines through the use of electric signal pulse-generating means arranged at particular points around the periphery of the blades or vanes and means for producing an appropriate time base display, the method comprising generating a first electric signal pulse at the time at which a synchronizing reference point on the rotor of the turbo-engine which locates a radius vector rotating rigidly with the rotor passes a fixed point in space adjacent the rotor, generating a second electric signal pulse at the time at which the tip of a selected blade or vane passes a second fixed point, triggering the time scan of the time base display with the first signal pulse, and modulating the time scan thus triggered with the second signal pulse whereby the magnitude, angular position, and duration of the second signal pulse is displayed together with appropriate calibration marks for ascertaining the oscillation frequency and angular displacement of the blade tips.

10. A method of testing rotary or non-rotary vanes or blades of turbo-engines through the use of vane-sensing electric signal pulse-generating means arranged at particular points around the periphery of the blades or vanes and an appropriate time base display means, the method comprising generating first and second electric signal pulses at the time at which the tip of a selected blade or vane passes first and second points fixed in space, respectively, triggering the time scan of the time base display with the first signal pulse, and modulating the time scan thus triggered with the second signal pulse whereby the magnitude, angular position, and duration of the second signal pulse is displayed together with appropriate calibration marks for ascertaining the oscillation frequency and angular displacement of the blade tip.

References Cited by the Examiner

UNITED STATES PATENTS

| 2,399,635 | 5/1946 | Hope | 73—70.1 |
| 2,575,710 | 11/1951 | Hardigg | 73—71.4 |
| 2,867,766 | 1/1959 | Broder et al. | 73—71.4 |
| 3,005,948 | 10/1961 | Broder et al. | 324—16 |
| 3,058,339 | 10/1962 | Shapiro | 73—71.4 |

FOREIGN PATENTS 762,759   12/1956   Great Britain.

RICHARD C. QUEISSER, *Primary Examiner.*

J. P. BEAUCHAMP, *Assistant Examiner.*